(12) United States Patent
Helpingstine et al.

(10) Patent No.: US 9,912,780 B2
(45) Date of Patent: Mar. 6, 2018

(54) METHOD AND APPARATUS FOR MODULE REMOTE REQUEST HANDLING

(71) Applicant: Ford Global Technologies, LLC, Dearborn, MI (US)

(72) Inventors: Kevin Lee Helpingstine, Ferndale, MI (US); Douglas A. Oliver, Redford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 304 days.

(21) Appl. No.: 14/703,935

(22) Filed: May 5, 2015

(65) Prior Publication Data

US 2016/0330292 A1 Nov. 10, 2016

(51) Int. Cl.
| | |
|---|---|
| *G06F 15/16* | (2006.01) |
| *H04L 29/08* | (2006.01) |
| *H04B 1/3822* | (2015.01) |
| *H04L 29/06* | (2006.01) |

(52) U.S. Cl.
CPC ......... *H04L 67/327* (2013.01); *H04B 1/3822* (2013.01); *H04L 67/02* (2013.01); *H04L 67/1097* (2013.01); *H04L 67/12* (2013.01); *H04L 69/04* (2013.01); *H04L 69/22* (2013.01)

(58) Field of Classification Search
CPC ....... H04L 67/327; H04L 67/12; H04L 69/04; H04L 67/02; H04L 67/1097; H04L 69/22; H04B 1/3822
See application file for complete search history.

(56) References Cited

U.S. PATENT DOCUMENTS

| | | | |
|---|---|---|---|
| 6,430,164 B1 * | 8/2002 | Jones ...................... | H04L 29/06 370/313 |
| 2011/0252161 A1 | 10/2011 | Ranney | |
| 2013/0159586 A1 * | 6/2013 | Kessler .................. | G06F 13/38 710/305 |
| 2014/0280710 A1 | 9/2014 | Wilson et al. | |
| 2015/0134754 A1 * | 5/2015 | Lauer ................. | H04B 7/18506 709/206 |
| 2016/0050265 A1 * | 2/2016 | Botticelli .............. | H04W 4/008 709/219 |
| 2016/0191584 A1 * | 6/2016 | Dickow ............. | H04L 65/4076 709/219 |

FOREIGN PATENT DOCUMENTS

CN 102508674 A 6/2012

* cited by examiner

*Primary Examiner* — John B Walsh
(74) *Attorney, Agent, or Firm* — Jennifer Stec; Brooks Kushman P.C.

(57) ABSTRACT

A system includes a processor configured to receive a request from a vehicle module and identify a receiving entity for the request. The processor is further configured to send the request to the identified entity and to receive a response from the identified entity and forward the received response to the vehicle module.

20 Claims, 3 Drawing Sheets

METHOD AND APPARATUS FOR MODULE REMOTE REQUEST HANDLING

TECHNICAL FIELD

The illustrative embodiments generally relate to a method and apparatus for handling remote data and access requests to and from vehicle software and hardware modules and components.

BACKGROUND

Vehicular infotainment and telematics modules, such as software modules and hardware components, may often benefit from data pulled from the cloud or a remote source such as the Internet. This real-time data can enable advanced driver assistance, can improve the driving experience, and can generally facilitate advanced computing features in a vehicle. Presently, this may present some difficulty, for while an embedded vehicular modem may provide connectivity, the commands and data structures that can be sent and received remotely may need to be very well defined in advance on both the modem and a module that is receiving remote data. Accordingly, if a new feature is added to vehicle software or hardware that may benefit from remote data, a modem software update may be required in order to handle the new requests, which can create a frustrating situation for a vehicle driver.

In one example, a communication services network is described that enables client communication devices to synchronously or asynchronously communicate with one another or with legacy communication devices through a gateway in either (i) a real-time mode or (ii) a time-shifted mode and (iii) to seamlessly transition between the two modes. As the media of a message is either created or retrieved from memory, the sending client device progressively transmits the media over the network. The network progressively routes the media as it is transmitted to the recipient client device or gateway, which progressively stores the media as it is received. With progressive storage, the recipient has the option of rendering the media as it is received in the real-time mode, rendering the media out of storage in the time-shifted mode, or seamlessly transitioning between the two modes. In addition, users may communicate with each other "live", similar to a conventional full duplex telephone call, when messages are synchronously transmitted and rendered in real-time with respect to one another. Alternatively, users may communicate with each other asynchronously by sending messages back and forth at discrete times, or by time-shifting the review of received messages.

In another current implementation, a computer implemented method is provided for monitoring and controlling a plurality of internet protocol (IP) enabled devices on a network. Each of the plurality of IP enabled devices has an internal IP address on the network, but does not have an external IP address for use on the Internet. The method includes the step of performing a port scan to obtain internal IP addresses for the plurality of IP enabled devices on the network. An HTML page is retrieved from each of the plurality of IP enabled devices on the network using the internal IP addresses. A data file name is extracted from each of the retrieved HTML pages and in some embodiments is translated to a new data file name. The method also includes retrieving data from each of the plurality if IP enabled devices on the network as a function of the extracted data file names or using the new data file names. Computer readable storage medium and gateway computing devices, for example in the form of a plug computer, are also disclosed.

SUMMARY

In a first illustrative embodiment, a system includes a processor configured to receive a request from a vehicle module. The processor is also configured to decode the response. The processor is also configured to identify a receiving entity for the request. The processor is further configured to send the request to the identified entity. Also, the processor is configured to receive a response from the identified entity, strip any HTTP headers from the response and forward the received response to the vehicle module.

In a second illustrative embodiment, a computer-implemented method includes receiving a request from a vehicle module. The method further includes decoding the response. The method also includes identifying a receiving entity for the request. Further, the method includes sending the request to the identified entity. The method additionally includes receiving a response from the identified entity, stripping any HTTP headers from the response and forwarding the received response to the vehicle module.

In a third illustrative embodiment, a non-transitory computer-readable storage medium stores instructions that, when executed by a processor, cause the processor to perform a method including receiving a request from a vehicle module. The method further includes decoding the response. The method also includes identifying a receiving entity for the request. Further, the method includes sending the request to the identified entity. The method additionally includes receiving a response from the identified entity, stripping any HTTP headers from the response and forwarding the received response to the vehicle module.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
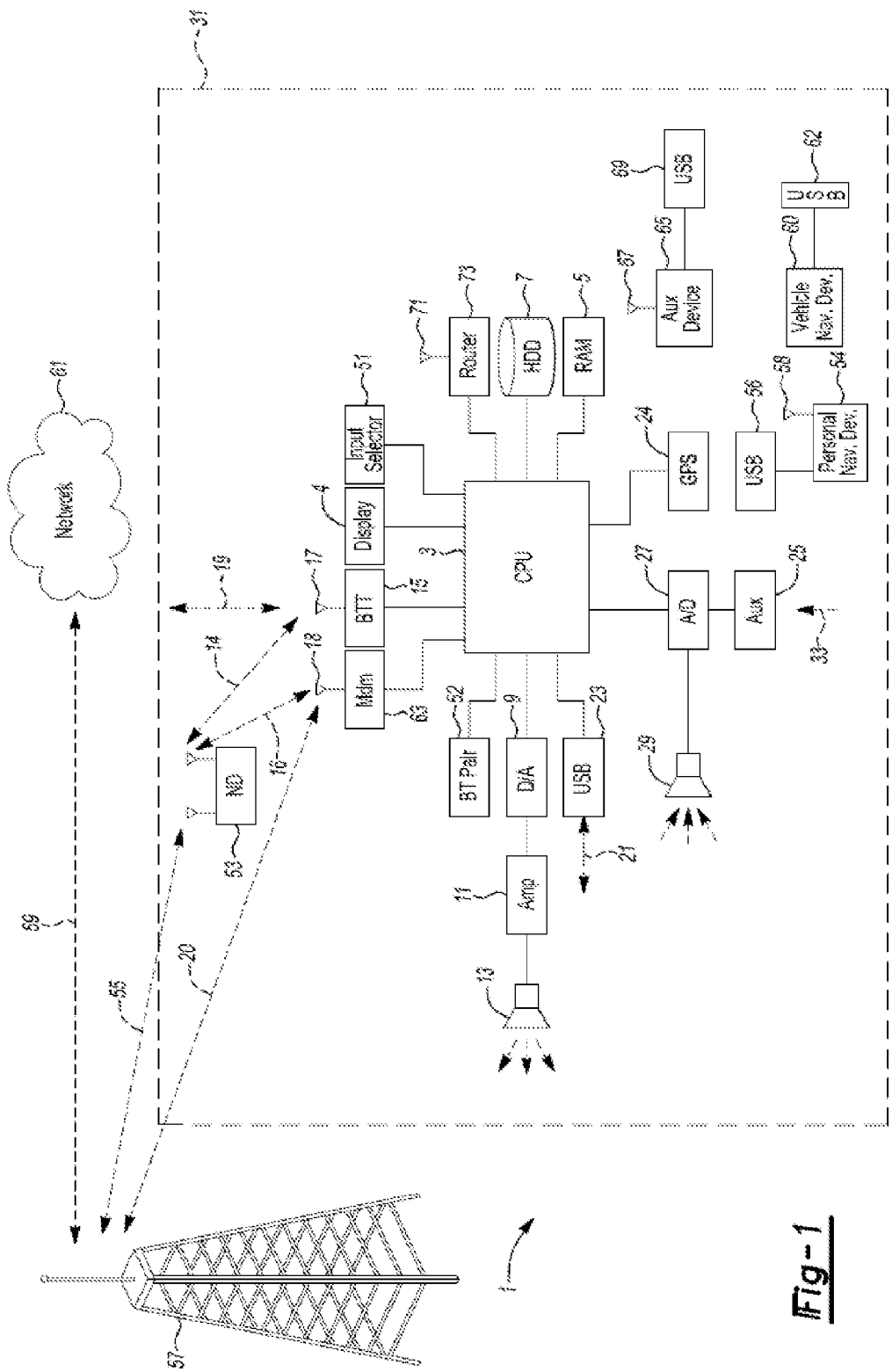
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like. The CPU can also communicate with any in-vehicle modules, such as, but not limited to, such as a powertrain controller, battery controller, climate control, or any other vehicle related controls/functions.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

In the illustrative embodiments, a vehicle modem may include software that is modified to receive HTTP request from a telematics module over a controller area network (CAN) bus on the vehicle. The embedded modem then acts as a gateway to in-vehicle modules for web services so individual modules do not have to implement an entire Ethernet stack. The web services may return simple XML or JSON data. The embedded modem may decode the entire request received over the CAN and forward it on to a remote service (e.g., without limitation, the Internet, a remote server, etc.). By allowing the embedded modem to act as a gateway, and having each module be responsible for request handling, software updates and changes may be made to the module without having to change the modem software.

The response may have its HTTP headers stripped, be compressed (such as, for example, without limitation, using GZIP or another suitable process) and passed back to the requesting module over the CAN, for example using the ISO-TP protocol. HTTP headers could also be retained for debugging purposes. The requesting module/component can then decompress and parse the response as required. Such a process can be used with any suitable in-vehicle hardware or software module.

In this illustrative manner, any vehicle module that might benefit from web or remote services or data can use the gateway without having to update modem software. The modem can maintain the cloud-facing link and simply forward requests back to the requesting modules. This also ensures that requests to the modules pass through the gateway, which adds increased security through advanced traffic-management, limiting unintended or malicious access. The solution could even support application level protocols other than HTTP or more complex requests such as full web pages.

Figure 2:
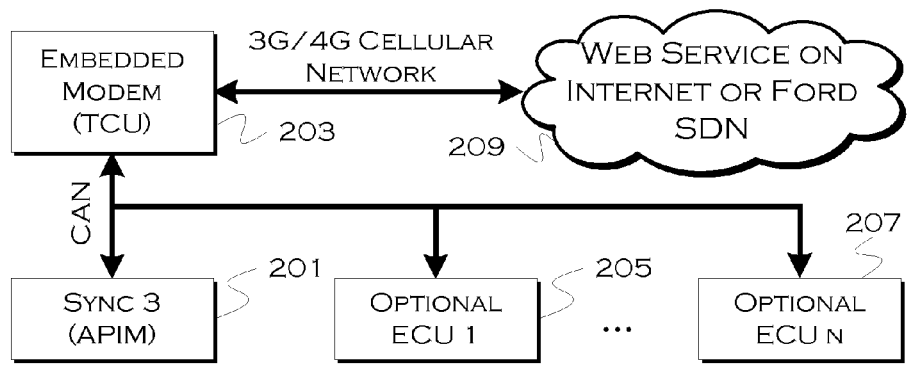
FIG. 2 shows an illustrative example of a communication network.

FIG. 2 shows an illustrative example of a communication network. In this illustrative example, the vehicle computing system (FORD SYNC, in this example) includes an Accessory Protocol Interface Module (APIM) 201, as well as a number of optional engine control unit (ECU) modules 205, 207. Other suitable software modules may also be present on the vehicle computing system or installed in the vehicle.

All of the modules use the vehicle CAN or another suitable vehicle network to communicate with the embedded modem 203, which, in this example, acts as a gateway to the remote services accessible on the cloud 209. The cloud can include, but is not limited to, web sites, public and private servers and any other source of remote data or functionality that may be requested by the vehicle modules.

Figure 3:
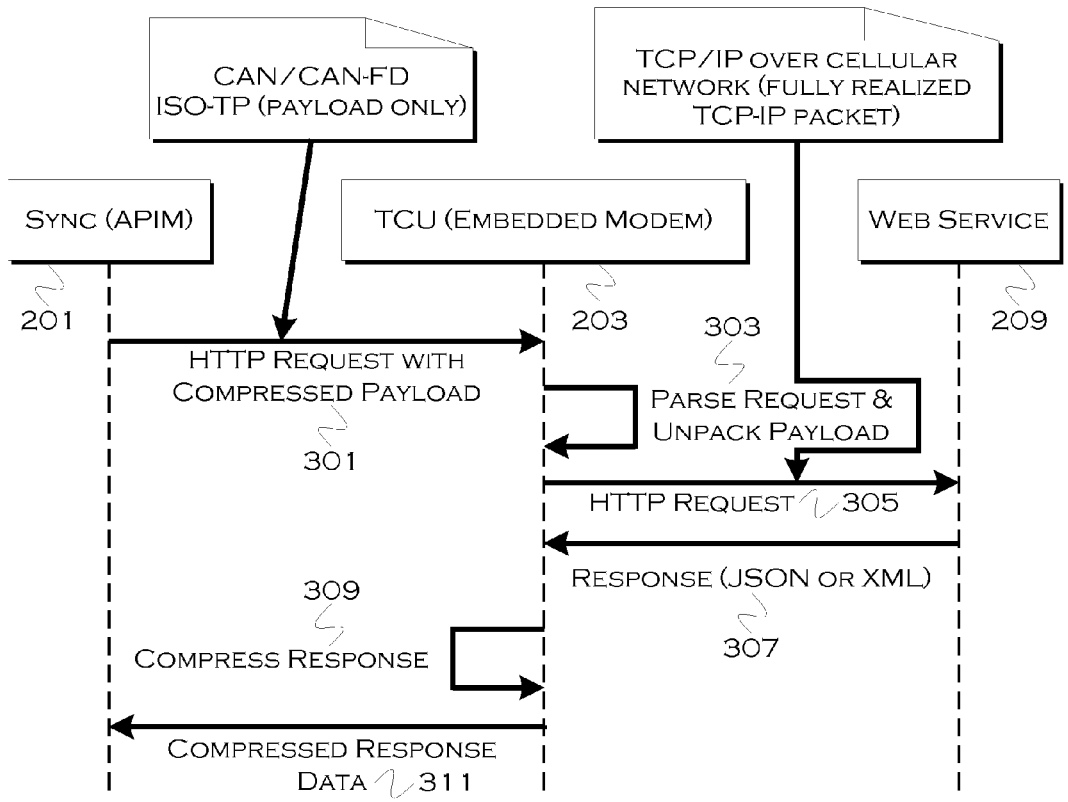
FIG. 3 shows an illustrative example of data request handling.

FIG. 3 shows an illustrative example of data request handling. When a request is generate by the vehicle module(s) 201, such as the APIM, the request may be sent as an HTTP request 301 with a compressed payload. Instead of merely sending the request along to the remote server, the embedded modem 203 may parse the request and unpack the compressed payload 303. The request is then passed by the embedded modem, and the payload and request is sent 305 to the remote server 209.

Presumably, this request will result in some form of response. In this example, the remote server responds with a JSON or XML request 307, intended to address the request from the APIM (or other module) handled by the modem acting as a gateway. The modem receives the response and performs any necessary security checks. The response is then compressed 309 and the compressed response data is sent to the APIM or other requesting module.

Figure 4:
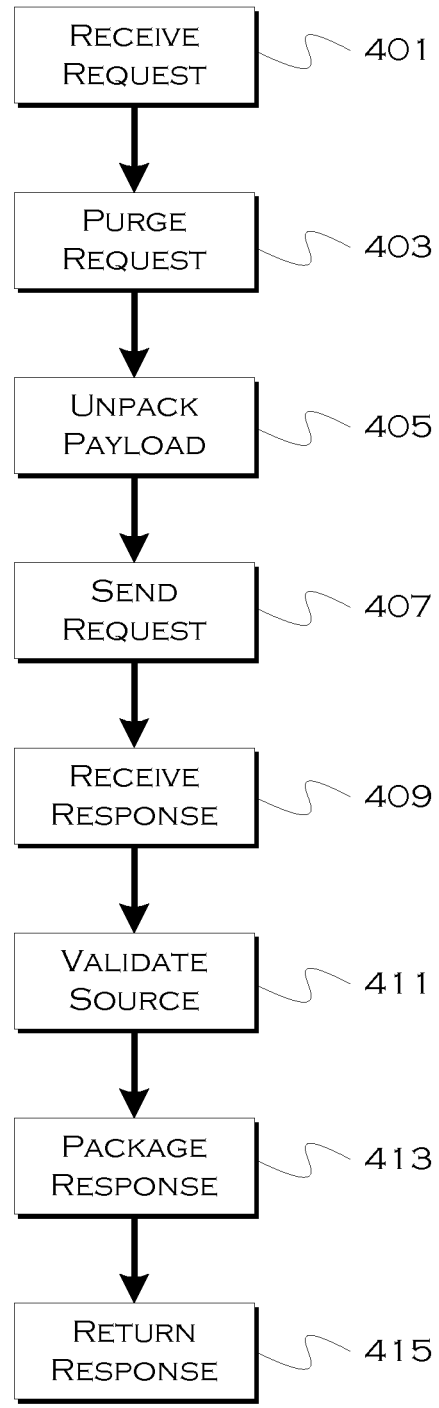
FIG. 4 shows an illustrative process for data request handling.

FIG. 4 shows an illustrative process for data request handling. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this illustrative example, the embedded modem will receive a request from a vehicle module, ECU, etc. 401. The request/response configuration and handling is done by the module itself, and the modem receives the request and a compressed payload from the requesting module.

Before forwarding the request (functioning as a gateway) the modem will parse the request 403 and unpack any included compressed payload 405. The request (such as an HTTP request) is then sent along to the entity to which the request was directed 407. Once the remote entity completes processing of the request, a response is received by the modem 409. The source of the response or communication intended for the vehicle module is validated 411, if desired, which can provide security against unauthorized access. The response may then be packaged 413 and sent to the requesting module 415.

By allowing the modem to act as a generic gateway, and by allowing the individual modules to handle the requests, updates to module software avoid additional updates to modem software, decreasing the update burden and improving user experience.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle system comprising:
a processor configured to:
receive a request from a vehicle module;
decode the received request;
identify a receiving entity for the request;
send the decoded request to the identified entity;
receive a response from the identified entity;
remove any HTTP headers from the response; and
forward the received response to the vehicle module.

2. The system of claim 1, wherein the request includes an HTTP request.

3. The system of claim 1, wherein the request includes a compressed payload, and the processor is further configured to decompress the payload before sending the request, including the payload, to the identified entity.

4. The system of claim 1, wherein the response is a JSON response.

5. The system of claim 1, wherein the response is an XML response.

6. The system of claim 1, wherein the processor is further configured to compress the response before forwarding the received response to the vehicle module.

7. The system of claim 1, wherein the processor is further configured to validate the response source before forwarding the received response to the vehicle module.

8. A computer-implemented method comprising:
receiving a request from a vehicle module at a vehicle modem;
decoding the received request via the vehicle modem;
identifying a receiving entity for the request via the vehicle modem;
sending the request to the identified entity via the vehicle modem;
receiving a response from the identified entity via the vehicle modem;
stripping HTTP headers from the response via the vehicle modem and
forwarding the received response from the vehicle modem to the vehicle module.

9. The method of claim 8, wherein the request includes an HTTP request.

10. The method of claim 8, wherein the request includes a compressed payload, and the method further includes decompressing the payload before sending the request, including the payload, to the identified entity.

11. The method of claim 8, wherein the response is a JSON response.

12. The method of claim 8, wherein the response is an XML response.

13. The method of claim 8, wherein the method further includes compressing the response before forwarding the received response to the vehicle module.

14. The method of claim 8, wherein the method further includes validating the response source before forwarding the received response to the vehicle module.

15. A non-transitory computer-readable storage medium, storing instructions that, when executed by a processor, cause the processor to perform a method comprising:
receiving a request from a vehicle module at a vehicle modem;
decoding the received request via the vehicle modem;
identifying a receiving entity for the request via the vehicle modem;
sending the request to the identified entity via the vehicle modem;
receiving a response from the identified entity via the vehicle modem;
stripping HTTP headers from the response via the vehicle modem and
forwarding the received response from the vehicle modem to the vehicle module.

16. The storage medium of claim 15, wherein the request includes an HTTP request.

17. The storage medium of claim 15, wherein the request includes a compressed payload, and the method further includes decompressing the payload before sending the request, including the payload, to the identified entity.

18. The storage medium of claim 15, wherein the response is a JSON response.

19. The storage medium of claim 15, wherein the response is an XML response.

20. The storage medium of claim 15, wherein the method further includes compressing the response before forwarding the received response to the vehicle module.

* * * * *